(12) United States Patent
Frost et al.

(10) Patent No.: US 12,587,456 B2
(45) Date of Patent: Mar. 24, 2026

(54) MACHINE LEARNING BASED EVENT MONITORING

(71) Applicant: International Business Machines Corporation, Armonk, NY (US)

(72) Inventors: Madeleine Frost, Morden (GB); Luke Taher, Heswall (GB); Shazia Jamil Kayani, Birmingham (GB); Matas Bartosevicius, Chatham (GB)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 17/683,713

(22) Filed: Mar. 1, 2022

(65) Prior Publication Data

US 2023/0283536 A1 Sep. 7, 2023

(51) Int. Cl.
| | |
|---|---|
| *G06F 16/28* | (2019.01) |
| *G06F 11/16* | (2006.01) |
| *G06N 20/00* | (2019.01) |
| *H04L 41/12* | (2022.01) |
| *H04L 41/16* | (2022.01) |
| *H04L 43/04* | (2022.01) |

(52) U.S. Cl.
CPC .......... *H04L 43/04* (2013.01); *G06F 11/1687* (2013.01); *G06N 20/00* (2019.01); *H04L 41/12* (2013.01); *H04L 41/16* (2013.01)

(58) Field of Classification Search
CPC ......... H04L 43/04; H04L 41/12; H04L 41/16; G06F 11/1687; G06N 20/00
See application file for complete search history.

(56) References Cited

U.S. PATENT DOCUMENTS

| | | | | |
|---|---|---|---|---|
| 10,572,336 | B2 * | 2/2020 | Aloysious | ............. G06F 16/219 |
| 10,977,293 | B2 | 4/2021 | Cai | |
| 2011/0078301 | A1 * | 3/2011 | Dehaan | ............... H04L 63/1433 |
| | | | | 709/224 |
| 2018/0025361 | A1 | 1/2018 | Ferrarons Llagostera | |

(Continued)

FOREIGN PATENT DOCUMENTS

| | | |
|---|---|---|
| IN | 201914052926 A | 9/2020 |
| WO | 2019221745 A1 | 11/2019 |

OTHER PUBLICATIONS

Authors et. al.: Disclosed Anonymously, "A Method to Use Analytics to Improve the Resolution Time of Incident Ticket Processing in Service Desk Operations", An IP.com Prior Art Database Technical Disclosure, IP.com No. IPCOM000240525D, IP.com Electronic Publication Date: Feb. 5, 2015, 3 pages.

(Continued)

*Primary Examiner* — Pierre Vital
*Assistant Examiner* — Abdou K Seye
(74) *Attorney, Agent, or Firm* — Monchai Chuaychoo

(57) ABSTRACT

Computer hardware and/or software that performs the following operations: (i) identifying rules for relating events in an event monitoring system; (ii) determining an event window having a set of related events within a particular time window, based, at least in part, on the rules; (iii) classifying the event window as actionable by applying a machine learning based classification model to information pertaining to the event window, the information originating from a plurality of data sources; and (iv) creating an event ticket for the event window in the event monitoring system.

19 Claims, 5 Drawing Sheets

(56)     References Cited

U.S. PATENT DOCUMENTS

| | | |
|---|---|---|
| 2018/0032862 A1 | 2/2018 | Oliner |
| 2018/0041500 A1 * | 2/2018 | Menahem |
| 2018/0150758 A1 * | 5/2018 | Niininen ................ G06N 5/025 |
| 2020/0134421 A1 * | 4/2020 | Suthar ................... G06F 11/302 |
| 2020/0202302 A1 | 6/2020 | Rathod |
| 2020/0242623 A1 | 7/2020 | Savir |
| 2020/0372415 A1 | 11/2020 | Mann |
| 2021/0020165 A1 | 1/2021 | Scodary |
| 2021/0027205 A1 * | 1/2021 | Sevakula ............. G06F 11/008 |
| 2021/0392049 A1 * | 12/2021 | Jeuk ................... H04L 41/0806 |

OTHER PUBLICATIONS

Authors et. al.: Disclosed Anonymously, "Automatic Categorization of IT Infrastructure Service Management Data Using Natural Language Processing and Machine Learning", An IP.com Prior Art Database Technical Disclosure, IP.com No. IPCOM000245200D, IP.com Electronic Publication Date: Feb. 18, 2016, 7 pages.

* cited by examiner

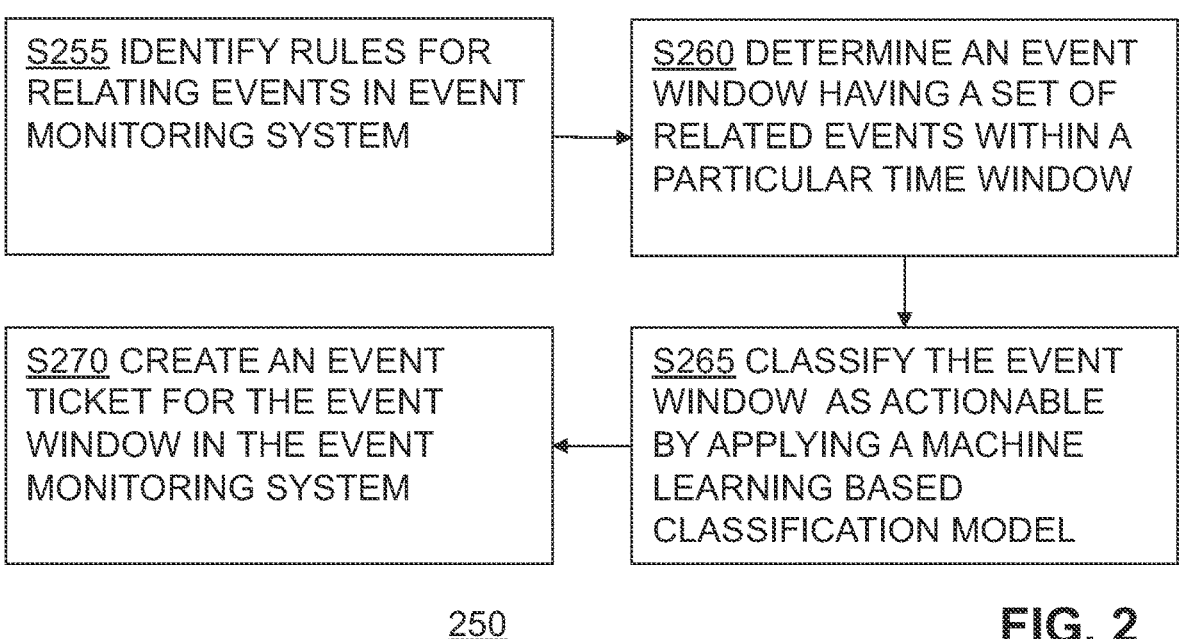

S255 IDENTIFY RULES FOR RELATING EVENTS IN EVENT MONITORING SYSTEM

S260 DETERMINE AN EVENT WINDOW HAVING A SET OF RELATED EVENTS WITHIN A PARTICULAR TIME WINDOW

S270 CREATE AN EVENT TICKET FOR THE EVENT WINDOW IN THE EVENT MONITORING SYSTEM

S265 CLASSIFY THE EVENT WINDOW AS ACTIONABLE BY APPLYING A MACHINE LEARNING BASED CLASSIFICATION MODEL

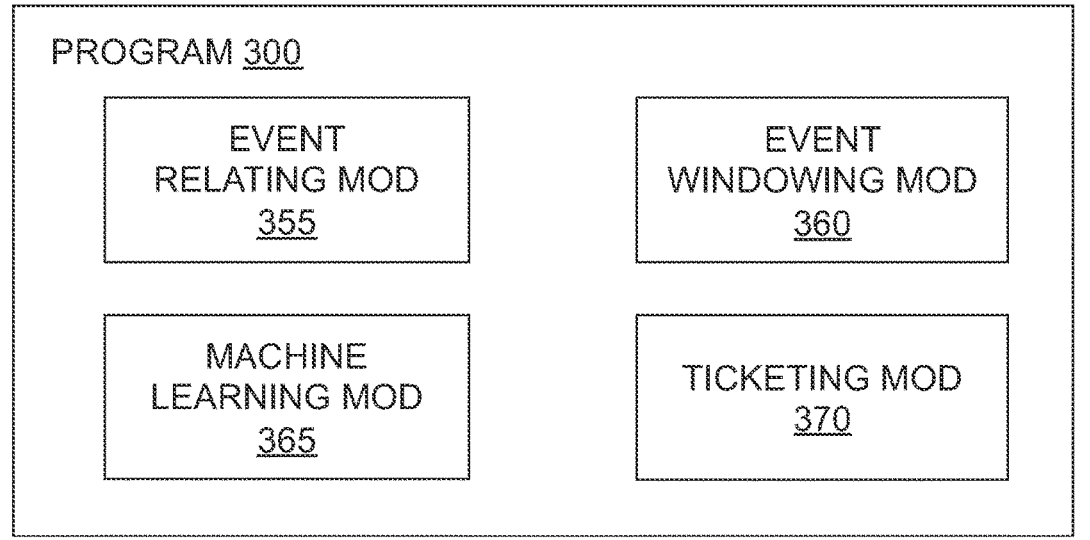

PROGRAM 300

EVENT RELATING MOD 355

EVENT WINDOWING MOD 360

MACHINE LEARNING MOD 365

TICKETING MOD 370

MODEL APPLIED TO LIVE ITSM SYSTEM S602

MODEL RAISES A TICKET ON AN ACTIONABLE SCENARIO? S604

YES

NO

OPERATOR MANUALLY RAISES A TICKET ON THE ACTIONABLE SCENARIO S610

OPERATOR VERIFIES TICKET IS VALID? S606

NO

YES

OPERATOR CLOSES TICKET S608

ASSOCIATED WINDOW IS LABELLED AS TICKETABLE / NON-TICKETABLE S612

LABELLED WINDOW ADDED TO TRAINING DATA SET FOR NEXT TRAINING CYCLE S614

MACHINE LEARNING BASED EVENT MONITORING

BACKGROUND

The present invention relates generally to the field of information technology (IT) event monitoring, and more particularly to utilizing machine learning to create event tickets in event monitoring systems.

Generally speaking, event monitoring includes the identifying, collecting, analyzing, and signaling of event occurrences across a computer system. Event monitoring is a common function included in various IT management systems for network management, IT systems management, and IT service management.

SUMMARY

According to an aspect of the present invention, there is a method, computer program product, and/or computer system that performs the following operations (not necessarily in the following order): (i) identifying rules for relating events in an event monitoring system; (ii) determining an event window having a set of related events within a particular time window, based, at least in part, on the rules; (iii) classifying the event window as actionable by applying a machine learning based classification model to information pertaining to the event window, the information originating from a plurality of data sources; and (iv) creating an event ticket for the event window in the event monitoring system.

BRIEF DESCRIPTION OF THE DRAWINGS

FIG. 2 is a flowchart showing a first embodiment method performed, at least in part, by the first embodiment system;

FIG. 3 is a block diagram showing a machine logic (for example, software) portion of the first embodiment system;

DETAILED DESCRIPTION

Figure 1:
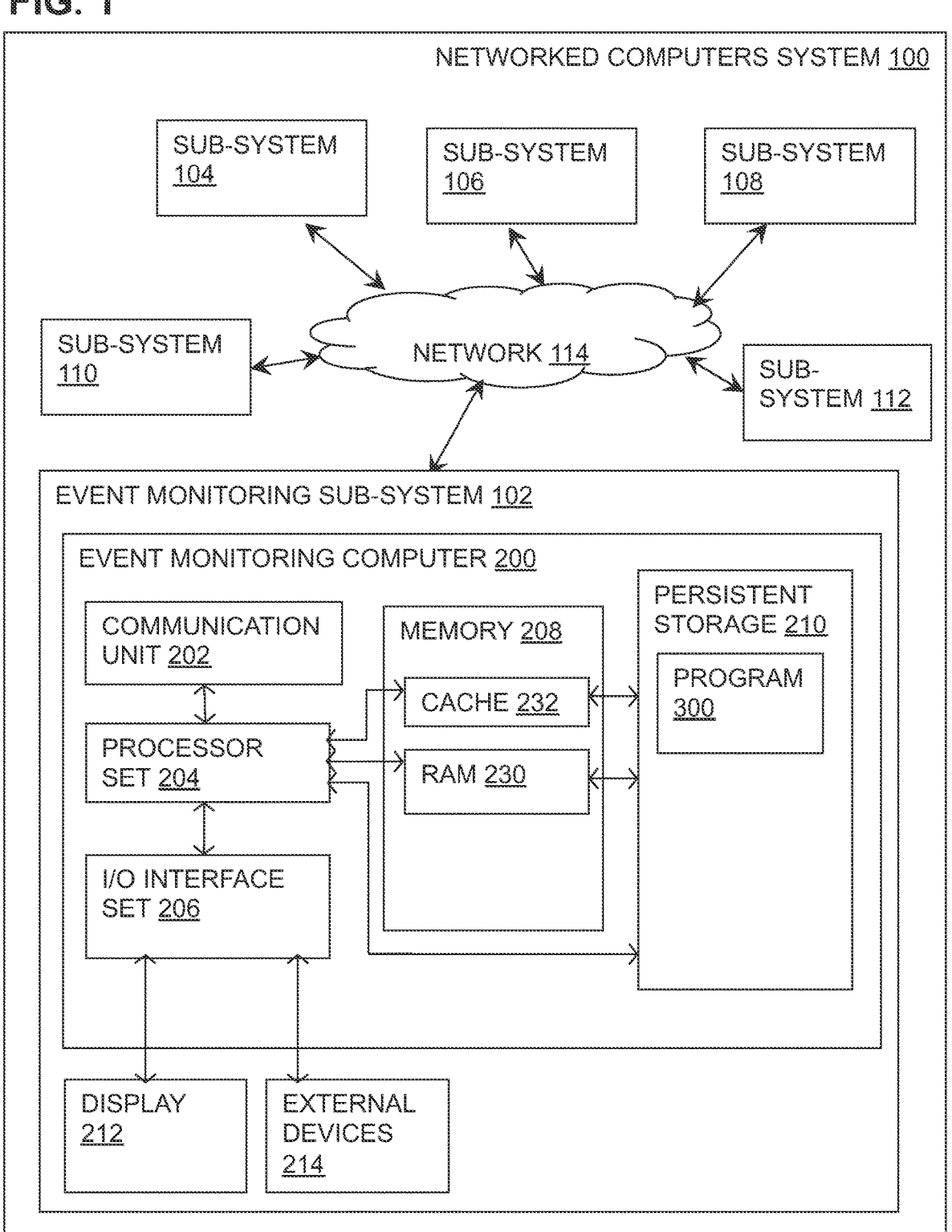
FIG. 1 is a block diagram view of a first embodiment of a system according to the present invention.

Event monitoring in information technology (IT) systems has become an increasingly complex endeavor, where many times single events alone are unable to diagnose significant problems such as security breaches and/or policy noncompliances. Various embodiments of the present invention address this problem by grouping related events into event windows and utilizing a machine learning model to classify the event windows as actionable based on a wide variety of information. In this way, as will be discussed below, various embodiments of the present invention improve upon existing solutions, which are typically limited in the sources of information on which they rely, and which do not window events in the manner disclosed herein.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk. C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: event monitoring sub-system 102; sub-systems 104, 106, 108, 110, 112; communication network 114; event monitoring computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

FIG. 2 shows flowchart 250 depicting a method according to an embodiment of the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Generally speaking, in this example embodiment (also referred to in this sub-section as the "present embodiment," the "present example," the "present example embodiment," and the like), event monitoring sub-system 102 (also referred to as an "event monitoring system") identifies, collects, analyzes, and signals event occurrences across networked computers system 100. The event occurrences (also referred to simply as "events") may originate from any of a wide variety of hardware and/or software sources, such as computer processors, operating systems, database management systems, and/or application software of sub-systems 104, 106, 108, 110, and/or 112. When event monitoring sub-system 102 determines that a particular combination of events is notable and/or actionable—for example, representative of a security breach or policy noncompliance—event monitoring sub-system 102 raises an event ticket so that further action can be taken.

In various embodiments, the event monitoring system is an information technology service management (ITSM) system. Generally speaking, an ITSM system comprises a suite of ITSM software (also sometimes referred to as information technology infrastructure library (ITIL) software), including a workflow management system and a configuration management database, and provides a service desk function for handling event tickets. While the present example embodiment is not an ITSM system per se, further description of an ITSM system according to various embodiments of the present invention can be found in the Further Comments and/or Embodiments sub-section of this Detailed Description section, below.

Processing begins at operation S255, where event relating module ("mod") 355 identifies rules (also referred to as "policies") for relating events in the event monitoring system. Any of a wide variety of methods for identifying related events may be used, including those now known and those yet to be known in the future. The present embodiment, for example, utilizes a relatedness score and a relatedness threshold, such that events having a relatedness score over a threshold are considered to be related under the rules. Relatedness itself may also be based on a wide variety of factors, and may be implemented using any of a wide variety of known (or yet to be known) techniques. In the present embodiment, for example, relatedness is based on a set of factors including: (i) which sub-system of networked computers system 100 a particular event affected/occurred on, and/or resources related to that sub-system; (ii) the type of the particular event; (iii) textual content of a log and/or metric relating to the particular event; (iv) the time the particular event occurred; (v) historical occurrences of events similar to the particular event; and/or (vi) factors specified by users of the event monitoring system.

Processing proceeds to operation S260, where event windowing mod 360 determines an event window having a set of related events within a particular time window, based, at least in part, on the rules. Stated another way, in this operation, event windowing mod 360 utilizes the rules identified by event relating mod 355 to identify related events in the event monitoring system that fit within a particular time window, thus forming an event window. The time window may be a specific amount of time (for example, five minutes), may be defined by an algorithm and/or by reference to one or more events monitored by the event monitoring system (for example, the amount of time it takes for sub-system 104 to reboot), or may be defined by other methods known (or yet to be known) in the art. Furthermore, as will be discussed in further detail below, the time window that defines the event window may change over time based on various relevant factors.

Processing proceeds to operation S265, where machine learning mod 365 classifies the event window as actionable by applying a machine learning based classification model. The machine learning based classification model (also referred to as the "machine learning model" and/or simply the "model") may be any of a wide variety of known (or yet to be known) classification models, including, for example, a binary classification model, a multi-class classification model, a multi-label classification model, an imbalanced classification model, and/or the like. Regardless of model type, the machine learning model is generally configured to: (i) receive, as input, information pertaining to an event window; and (ii) produce, as output, an indication of whether the event window is actionable, as defined by the training of the model.

In the present example embodiment, the machine learning model is trained for binary classification through backpropagation, by providing the following training data as inputs: (i) a set of event windows associated with historic event tickets, labelled as actionable, and (ii) a set of event windows not associated with historic event tickets, labelled as non-actionable. The training data may be produced via a wide variety of known (or yet to be known) methods, including supervised methods (i.e., methods involving human annotators), unsupervised methods (i.e., methods that do not involve human annotators), and/or semi-supervised methods (i.e., methods utilizing both human annotators and automated annotation techniques).

In various embodiments, the applying of the machine learning based classification model includes applying the model to information pertaining to the event window. In many cases, including in the present example embodiment, the information includes information originating from a plurality of data sources, such as logs (or "log data") from a log source, metrics (or "metric data") from a metrics source, and topology models (or "topology data") from a topology data source (where the topology models may be, for example, topology models of networked computers system 100). Examples of log data, metric data, and topology data according to embodiments of the present invention can be found in the Further Comments and/or Embodiments sub-section, below. By including information from a plurality of sources, various embodiments of the present invention are able to generate better machine learning classifications than those generated from singular data sources.

In various embodiments, the machine learning based classification model is trained by machine learning mod 365 of program 300 itself, or by various other modules and/or programs of networked computers system 100. In other embodiments, the training may occur elsewhere, such as by computer systems configured specifically for machine learning model training, as are known (or yet to be known) in the art.

Furthermore, in various embodiments, the applying of the machine learning based classification may not result in classifying the event window as actionable. In these cases, as will be discussed in further detail below, processing may return to operation S260 to redefine the event window, or otherwise processing may end.

Processing proceeds to operation S270, wherein ticketing mod 370 creates an event ticket for the event window in the event monitoring system. Because the event window has been classified as actionable, ticketing mod 370 determines to create an event ticket for the event window for further handling by a user of the event monitoring system, or by the event monitoring system itself. In many cases, including in the present example embodiment, mod 370 appends the information pertaining to the event window, utilized above in the classification of the event window by the machine learning model, to the event ticket.

In various embodiments, upon creating the event ticket, further operations (not shown) are performed to improve the quality of the machine learning based classification model. For example, in various embodiments, program 300 receives classification feedback from a user of the event monitoring system, and uses the feedback to further train (or direct the further training) of the machine learning model. For example, in various embodiments, if the classification feedback indicates that the event window is non-actionable, the further training of the model includes adjusting weights of the model to decrease a probability of the event window being classified as actionable. Conversely, for example, if the classification feedback indicates (i.e., confirms) that the event window is actionable, the further training of the machine learning model includes adjusting weights of the machine learning model to increase a probability of the event window being classified as actionable. Still further, in various embodiments, if the classification feedback indicates that no event ticket was created for an otherwise actionable event window, the further training of the machine learning model includes adjusting weights of the machine learning model to increase a probability of the actionable event window being classified as actionable.

As mentioned above, in some cases the applying of the machine learning based classification may not result in classifying the event window as actionable. For example, in various embodiments, determining the event window first includes determining a candidate event window having a set of related events within a candidate time window, based, at least in part, on the rules. The candidate event window is then classified as non-actionable by the machine learning based classification model, and as a result program 300 modifies the candidate event window to form another candidate event window, which eventually becomes the final event window once it is classified as actionable.

Figure 4:
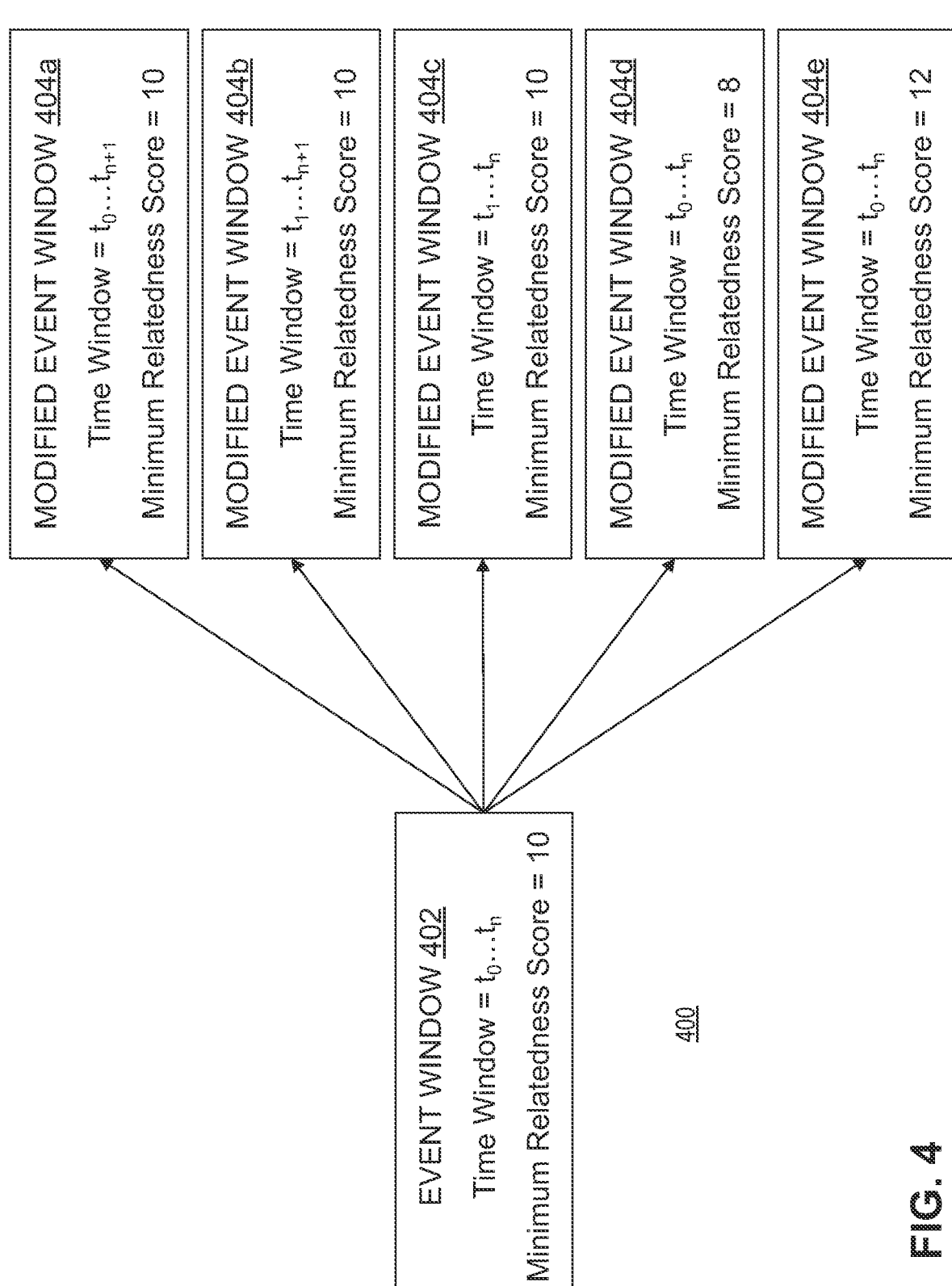
FIG. 4 is a diagram depicting example event window modifications according to various embodiments of the present invention.

FIG. 4 includes diagram 400 depicting example event window modifications according to various embodiments of the present invention. As shown in FIG. 4, in many cases event window modifications take the form of a time window modification. For example, event window 402 includes a time window of $t_0 \ldots t_n$ and a minimum relatedness score of 10. In some cases, modifying the candidate event window includes expanding the candidate time window to include one or more additional related events, such as in modified event window 404a, where the time window has been expanded to include $t_{n+1}$. In other cases, modifying the candidate event window includes moving the candidate time window forward in time to include one or more additional related events while removing one or more previously included related events, such as in modified event window 404b, where $t_{n+1}$ has been added to the time window but to has been removed. In still other cases, modifying the candidate event window includes shrinking the candidate time window to remove one or more related events, such as in modified event window 404c, where to has been removed but where no additional time has been added.

Still referring to FIG. 4, in various embodiments, event window modifications take the form of relatedness score modifications. For example, in some cases, modifying the candidate event window includes decreasing the minimum relatedness score so that more potential events are eligible, such as in modified event window 404*d*, where the minimum relatedness score has been decreased from 10 to 8. In other cases, modifying the candidate event window includes increasing the minimum relatedness score so that fewer potential events are eligible, such as in modified event window 404*c*, where the minimum relatedness score has been increased from 10 to 12. In still other cases (not shown), modifying the candidate event window includes a combination of time window modifications and relatedness score modifications, and/or other modifications as are known (or yet to be known) in the art.

In various embodiments, modifying the candidate event window includes repeatedly modifying (e.g., expanding) the candidate time window (e.g., after each modification/expansion) until either: (i) a classification of actionability occurs, or (ii) a keep-open time expires. The keep-open time may, for example, be fixed (e.g., five minutes), or may be calculated based on a formula or algorithm. In an example where the machine learning based classification model produces probabilities for each classification, the probability that the candidate event window is actionable (the "probability of actionability") may also be used in calculating the keep-open time. For example, the probability of actionability may be calculated after each modification of the candidate event window, producing a new, most recent, keep-open time each time. The amount of time that the candidate event window has been open may also be used in calculating the keep-open time-either alone or in combination with the probability of actionability.

III. Further Comments and/or Embodiments

Various embodiments of the present invention utilize a convolutional neural network (CNN) to make predictions on windows of events created using event grouping policies to predict when a ticket should be raised for an actionable scenario. Various embodiments train the CNN on multiple sources, thereby increasing the reliability of the tickets being created. Various embodiments also allow predictions to be made on sets of events that individually would not be considered actionable, but occurring together over a period of time would result in a ticket being raised.

Various embodiments of the present invention recognize the following facts, potential problems and/or potential areas for improvement with respect to the current state of the art: (i) existing methods focus primarily on textual data, and do not make use of data from other sources, such as topology or ticketing windows; (ii) existing methods do not utilize windows to analyze events as described herein; and/or (ii) existing methods typically require manual intervention and do not create tickets automatically.

Various embodiments of the present invention recognize that management of IT systems is an increasingly complex problem for large organizations with expanding IT infrastructure. Many organizations employ Network Operations Centres (NOCs) in which trained operators utilize IT Service Management (ITSM) software to diagnose and repair problems (incidents) in real time as they occur within their IT infrastructure.

Various embodiments of the present invention also recognize that incidents typically occur on resources (for example, physical or virtual devices) within an IT infrastructure. Often, these resources are relied on by one or more other resources, known as child resources, which in turn may be depended on by their own children. Consequently, incidents might include alerts from multiple resources, each indicating a local problem.

Various embodiments of the present invention recognize that while current ITSM software may be capable of diagnosing problems based on patterns that occurred in the past, such software typically requires human intervention or rule-based policies to raise tickets.

Various embodiments of the present invention automate the ticket creation process utilizing insight data (for example, from Netcool Operations Insight) and a deep learning classifier. Various embodiments make use of log data (for example, provided by log analysis), historical data and policies (for example, provided by an analytics function), metric data (for example, provided by a cloud automation manager such as IBM Cloud Automation Manager (ICAM)), and topology data (for example, provided by Agile Service Manager (ASM)) to train a learning classifier that is capable of creating tickets in real time based on incoming events. (Note: the term(s) "NETCOOL" and/or "IBM" may be subject to trademark rights in various jurisdictions throughout the world and are used here only in reference to the products or services properly denominated by the marks to the extent that such trademark rights may exist.)

A simple example of log data according to an embodiment of the present invention follows:

Example Log Data

```
[
    {
        "log": "US clients experiencing high response times
            while connecting to onlinesales"
        "timestamp": 1645115136
    },
    {
        "log": "north region clients experiencing high
            response times while connecting to onlinesales",
        "timestamp": 1645115139
    },
    {
        "log": "Synthetic test failed for >1 min on https://
            onlinesales.example.com",
        "timestamp": 1645115143
    },
    {
        "log": "process http_proxy is consuming 99% CPU",
        "timestamp": 1645115163
    },
    {
        "log": "CPU is thrashing at 99% utilization on
            HTTPProxy",
        "timestamp": 1645115168
    },
    {
        "log": "Online Banking Failure-unreachable/cpu
            utilisation exceeded.",
        "timestamp": 1645115188
    }
]
```

A simple example of metric data according to an embodiment of the present invention follows:

Example Metric Data

```
[
    {
        "name": "OnlineSales APP ResponseTime",
        "timestamp": "2020-09-01T01:00:00Z",
        "value": 590,
        "max": 1729.889663696289,
```

```
    "min": −109.56231689453125,
    "expected": 817.9933834075928,
    "anomalous": false,
    "anomalyEndTimestamp":      "2020-09-01T01:05:
        00Z"
},
{
    "name": "OnlineSales APP ResponseTime",
    "timestamp": "2020-09-01T01:05:00Z",
    "value": 2000,
    "max": 1829.889663696289,
    "min": −90.56231689453125,
    "expected": 717.9933834075928,
    "anomalous": true,
    "anomalyEndTimestamp":      "2020-09-01T01:10:
        00Z"
},
{
    "name": "OnlineSales APP ResponseTime",
    "timestamp": "2020-09-01T01:10:00Z",
    "value": 2000,
    "max": 1929.889663696289,
    "min": −80.56231689453125,
    "expected": 617.9933834075928,
    "anomalous": false,
    "anomalyEndTimestamp":      "2020-09-01T01:15:
        00Z"
}
]
```

A simple example of topology data according to an embodiment of the present invention follows:

Example Topology Data

```
{
    "status": "{hostname=server1.hyper.example.com,
    name=server1.hyper.example.com,
    service=server1.hyper.example.com, type=Service}
    Error rate high:++:Error rate-",
    "state": "open",
    "severity": "major",
    "beginTime": 1638296996102,
    "observedTime": 1638296996102,
    "description": "server1 hyper application error rate high",
    "eventManager": "aiops",
    "eventId": "7a481252-a965-4b9f-b043-88e495abf2da",
    "tenantId": "cfd95b7e-3bc7-4006-a4a8-a73a79c71255",
    "resources": [
        {
            "uniqueId": "server1.hyper.example.com",
            "name": "server1.hyper.example.com",
            "_id": "LGkhC-txRaSI5S9XD9sAFQ"
        }
    ],
    "groups": [
        {
            "name": "front-end-svc.myapp.example.com",
            "tags": [
                "all"
            ],
            "entityTypes": [
                "cluster",
                "completeGroup"
            ],
            "changeTime": 1638296912157,
            "_id": "GWnPLBqMT3-LuBrjBsUUfA"
        }
    ],
    "statusId": "Ztnqbl1TTi-5LdfCwfc2xg",
    "_id": "Ztnqbl1TTI-5LdfCwfc2xg"
}
```

The novel method of ticket creation performed by various embodiments of the present invention inverts the standard ticket creation paradigm of common ITSM systems. In various embodiments, a discriminative model is trained to detect actionable scenarios from a live situational ontology comprising event, metric, log, and topology data. When the likelihood of an actionable scenario exceeds a probabilistic pre-set threshold, a ticket is automatically raised.

Unlike traditional applications of machine learning to ITSM, which focus on aggregation and analysis of live data to form event groups or more data-rich incidents which can then be operated on, approaches of various embodiments of the present invention bypass the entire process and instead focus on identifying if and when an actionable scenario has developed, producing a ticket when such a scenario is detected. The ticket is subsequently enriched with the relevant live data from the situational ontology.

Various embodiments of the present invention also recognize that by utilizing various methods described herein, it becomes possible to selectively monitor only specific subsets of an environment based on the ongoing statuses of the situational ontologies.

In various embodiments, a method for automated ITSM monitoring includes: (i) training a convolutional neural network classifier to predict the likelihood of a ticket being raised for a given window of events and their associated log, metric, and topology data; (ii) applying the trained classifier to a live ITSM system to automatically predict and create tickets; and/or (iii) re-training and updating the classifier to improve future ticket creation.

Various advantages of such a method include the ability to: (i) anticipate and pre-emptively raise tickets as a problem is emerging within the ITSM system to allow problems to be detected earlier and reduce the MTTR (mean time to resolve); (ii) encode operator domain knowledge into a model which can then be applied to new unseen problems and help detect them early; (iii) use intelligent windowing, where state information only needs to be maintained for a reduced amount of data and time; (iv) use flexible data inputs from a variety of sources in any situational ontology; and/or (v) selectively monitor relevant subsections of an environment based on situational ontologies.

Various embodiments of the present invention provide a method for real time ticket creation in ITSM system. In various embodiments, the method makes use of a discriminative model trained to detect actionable scenarios in a monitored ITSM environment to automatically raise tickets without the need for human intervention. Generally speaking, this method assumes: (i) there is an existing ITSM environment containing an operator which is monitoring the network and automatically raising events, and (ii) there are event grouping policies in place which identify events that are from related resources.

In various embodiments, a multi-layer convolutional neural network classifier is trained to predict the likelihood of a ticket being raised for a given window of events and their associated log, metric, and topology data. In various embodiments, the convolutional neural network is trained on a dataset of windows. These windows each contain historic events and the time t at which they occurred, as well as the associated log, metric, and topology data. Each window in the dataset is either: (i) a window derived from events which were associated with a historic ticket raised within the system, or (ii) a window derived from events which occurred in a randomly selected time range where a ticket was not raised. Each window within the training dataset is labelled with an integer value of either 0 or 1, corresponding to whether or not a ticket was raised for the contents of the window.

In various embodiments, a model is derived from the multi-layer trained convolutional neural network classifier. In various embodiments, the input layer of the model receives a 3-D matrix representation of a window. The window matrix consists of a set of 2-D matrices, each of which represents an event and its associated log, metric, and topology data, each vectorised using specialized embedding models. The output layer of the model produces a probability between 0 and 1.

In various embodiments, during training, a loss function is used to evaluate the output of the model against the corresponding training dataset labels. This loss function will optimize the model's ability to predict the label for each window in the dataset.

In various embodiments of the present invention, the trained model can then be used to predict and create tickets in a live ITSM system. In various embodiments, the model uses the existing event grouping policies in the ITSM system to route incoming events into windows of related events. Each time one of these windows is created or updated, either by a new incoming event or a change in the associated log, metric, or topology data, the model will calculate the probability that a ticket should be raised based on the events present in the window. If the probability outputted by the model exceeds a configurable pre-set threshold, a ticket will automatically be created.

In various embodiments, appropriate context will be added to the opened ticket from the window at the time of ticket creation. Additionally, further updates to the window will result in updates to the ticket up until the point the window is closed.

Various embodiments of the present invention provide scenarios that could result in a window being closed. Some examples include: (i) the probability of the window decreasing below the pre-set threshold after a ticket has already been created; (ii) the ticket associated with a window being closed manually by an operator; and (iii) the keep-open time on a window expiring.

In various embodiments, the keep-open time of a window defines an upper bound based on both the duration that the window has been open and the latest probability calculated by the model. In various embodiments, each time the window is updated, the keep-open time is recalculated. The longer the window has been opened, the smaller the keep-open time, and the higher the latest probability, the larger the keep-open time. In one embodiment, the keep-open time is calculated using a simple normalized sum.

Figure 5:
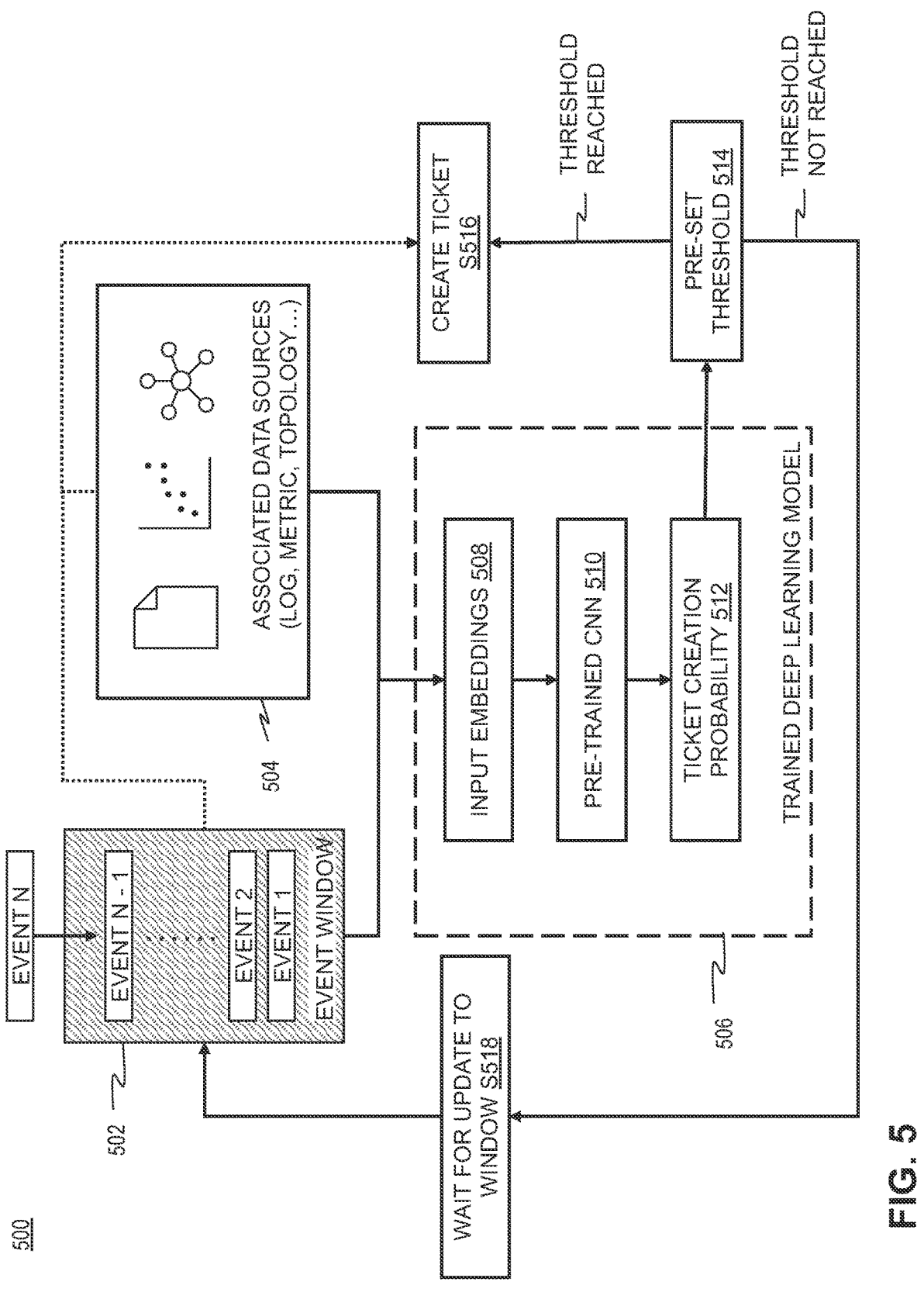
FIG. 5 is a block diagram view depicting a system flow according to an embodiment of the present invention.

FIG. 5 is a block diagram view depicting a system flow according to an embodiment of the present invention. As shown in FIG. 5, system flow 500 includes event window 502, associated data sources 504, and trained deep learning model 506. Event window 502 includes event 1, event 2, and event N−1. Information from event window 502 and associated data sources 504 (including log, metric, and topology data) are converted into input embeddings 508 and input into pre-trained CNN 510, resulting in ticket creation probability 512. Ticket creation probability 512 is then compared to pre-set threshold 514. If ticket creation probability 512 reaches pre-set threshold 514, a ticket is created (S516) and information from event window 502 and associated data sources 504 is added as context to the created ticket. Alternatively, if ticket creation probability 512 does not reach pre-set threshold 514, the system waits (S518) for an update to event window 502, and processing begins again. In this embodiment, for example, processing repeats for each new event (for example, event N) that is added to event window 502.

In various embodiments, after the trained model is used to predict and create tickets in the live ITSM system, the neural network model is then re-trained and updated to improve future ticket creation. For example, after the model has been applied to the live ITSM system, the model is continuously re-trained and updated to ensure the model is able to capture previously seen scenarios where it may have incorrectly predicted the probability for ticket creation.

In various embodiments, an operator may work alongside the model and manually open tickets on actionable scenarios the model may have missed, possibly due to incident scenarios being never-before-seen, as well as manage the tickets that are opened by the model. For example, in various embodiments, the operator will close a ticket raised by the model that the operator deems to have been wrongly opened on a non-actionable scenario, and/or the operator will raise a ticket for a scenario that the operator deems to be actionable that did not result in a ticket being raised by the model.

In various embodiments, the tickets raised or closed manually by the operator will then become part of the training data and labelled accordingly. This data will then be fed back into the model in training cycles to correct the instances where the model's predictions were incorrect. For example, for the tickets that were raised by the model on a non-actionable scenario (false positive), the model will be retrained on this example and penalized by the loss function for producing a high probability. The weights of the model will be adjusted through gradient descent to optimize against producing a high probability for this and similar scenarios. As another example, for tickets not raised by the model on actionable scenarios, the model will be retrained on the tickets raised manually by the operator and penalized by the loss function for producing too low of a probability. The weights of the model will then be adjusted through gradient descent to optimize against producing a low probability for this and similar scenarios.

In various embodiments, the retraining cycles allow the model to become more accurate over time as well as ensure the model learns to correctly process windows which were previously unseen in future scenarios.

Figure 6:
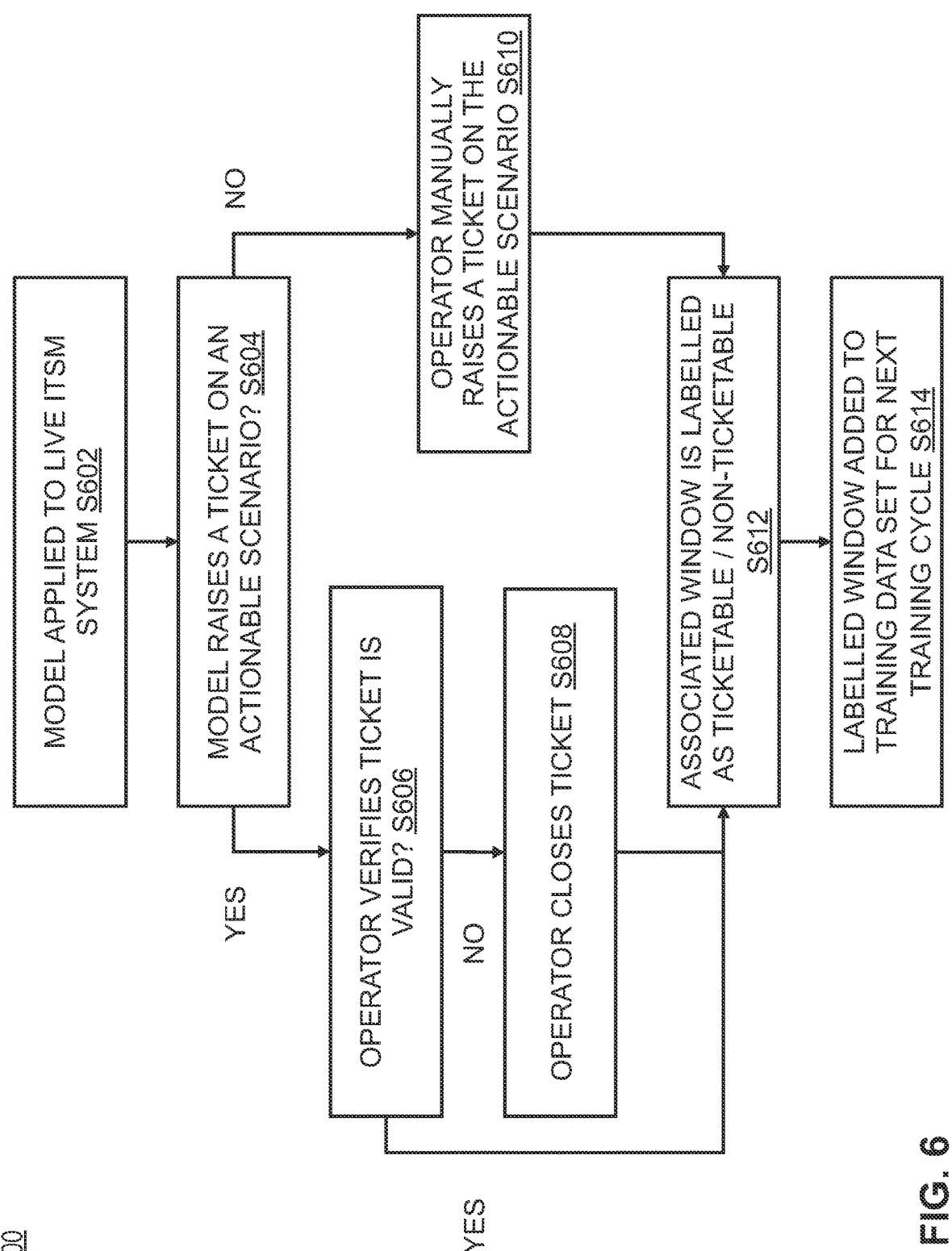
FIG. 6 is a flowchart showing a method according to an embodiment of the present invention.

FIG. 6 shows flowchart 600 depicting a method according to an embodiment of the present invention. As shown in FIG. 6, processing begins with operation S602, where the machine learning model is applied to a live ITSM system. Processing proceeds to operation S604, where it is determined whether the model raises (that is, creates) a ticket on an actionable scenario. If yes, then an operator verifies (S606) if the ticket is valid. If the ticket is verified as valid, processing proceeds to operation S612; if not, the operator first closes the ticket (S608), and then processing proceeds to operation S612. Back at operation S604, if it is determined that the model does not raise a ticket on an actionable scenario, the operator manually raises a ticket on the actionable scenario at operation S610. Processing then proceeds to operation S612. At operation S612, the window associated with the ticket/non-ticket is accordingly labelled as ticketable or non-ticketable, as the case may be. Processing then proceeds to operation S614, where the labelled window is added to the training data set for the next training cycle of the machine learning model.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above-similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:

in a computerized-system comprising a processor, a database and a memory, receiving by the processor, one or more datasets within an information technology service management (ITSM) system where the one or more datasets is to be processed, the processor is configured to:

identifying rules for relating events in an event monitoring system associated with the ITSM system;

determining an event window from the one or more datasets having a set of related events within a particular time window, based, at least in part, on the rules, wherein determining the event window comprises:

determining a candidate event window having a set of related events within a candidate time window, based, at least in part, on the rules;

classifying the candidate event window as non-actionable by applying a machine learning based classification model to information pertaining to the candidate event window; and modifying the candidate event window to form the event window, wherein modifying the candidate event window to form the event window comprises expanding the candidate time window to include one or more additional related events;

training the machine learning based classification model, wherein an input layer to the machine learning based classification model receives a three-dimensional (3D) matrix representation of the event window further comprising:

classifying the event window as actionable by applying the machine learning based classification model to the information pertaining to the event window, the information pertaining to the event window originating from a plurality of data sources;

determining whether the event window is actionable; and responsive to classifying the event window as actionable, wherein the event window is related to a security breach event or a non-compliant event, automatically creating, by the machine learning based classification model, an event ticket for the event window in the event monitoring system.

2. The computer-implemented method of claim 1, further comprising:

appending to the event ticket the information pertaining to the event window.

3. The computer-implemented method of claim 1, wherein the event monitoring system includes information technology service management (ITSM) software.

4. The computer-implemented method of claim 1, further comprising training the machine learning based classification model, wherein an input layer to the machine learning based classification model receives a three-dimensional (3D) matrix representation of the event window.

5. The computer-implemented method of claim 4, wherein training the machine learning based classification model includes providing, as training data: (i) a set of event windows associated with historic event tickets, labelled as actionable, and (ii) a set of event windows not associated with historic event tickets, labelled as non-actionable.

6. The computer-implemented method of claim 4, further comprising:

receiving classification feedback from a user of the event monitoring system; and further training the machine learning based classification model based, at least in part, on the received classification feedback.

7. The computer-implemented method of claim 6, wherein:

the classification feedback indicates that the event window is non-actionable; and the further training of the machine learning based classification model includes adjusting weights of the machine learning based classification model to decrease a probability of the event window being classified as actionable.

8. The computer-implemented method of claim 6, wherein:

the classification feedback confirms that the event window is actionable; and the further training of the machine learning based classification model includes adjusting weights of the machine learning based classification model to increase a probability of the event window being classified as actionable.

9. The computer-implemented method of claim 6, wherein:

the classification feedback indicates that no event ticket was created for an actionable event window; and the further training of the machine learning based classification model includes adjusting weights of the machine learning based classification model to increase a probability of the actionable event window being classified as actionable.

10. The computer-implemented method of claim 1, wherein the plurality of data sources includes a log source, a metrics source, and a topology data source.

11. The computer-implemented method of claim 10, wherein the information includes a topology model of a computer system being monitored by the event monitoring system.

12. The method of claim 10, further comprising:

training a convolutional neural network (CNN) classifier to predict a likelihood of a ticket being raised for the event window based on the log data, the metric data and the topology data; and applying the trained CNN classifier to create the ticket.

13. The computer-implemented method of claim 1, wherein modifying the candidate event window to form the event window further comprises repeatedly expanding the candidate time window until a keep-open time expires.

14. The computer-implemented method of claim 13, further comprising calculating the keep-open time based, at least in part, on a probability of actionability produced by the machine learning based classification model.

15. The computer-implemented method of claim 13, further comprising repeatedly calculating the keep-open time based, at least in part, on: (i) an amount of time that the candidate event window has been open, and (ii) a most recent probability of actionability produced by the machine learning based classification model.

16. The computer-implemented method of claim 15, wherein repeatedly calculating the keep-open time comprises calculating the keep-open time after each expansion of the candidate time window.

17. The computer-implemented method of claim 1, wherein modifying the candidate event window to form the event window comprises moving the candidate time window forward in time to include one or more additional related events while removing one or more previously included related events.

18. A computer program product comprising one or more computer readable storage media and program instructions collectively stored on the one or more computer readable storage media, the program instructions executable by one or more computer processors to cause the one or more computer processors to perform a method comprising:

identifying rules for relating events from one or more datasets in an event monitoring system, such as, an information technology service management (ITSM) system;

determining an event window having a set of related events within a particular time window, based, at least in part, on the rules, wherein determining the event window comprises:

determining a candidate event window having a set of related events within a candidate time window, based, at least in part, on the rules;

classifying the candidate event window as non-actionable by applying a machine learning based classification model to information pertaining to the candidate event window; and modifying the candidate event window to form the event window, wherein modifying the candidate event window to form the event window comprises expanding the candidate time window to include one or more additional related events;

training the machine learning based classification model, wherein an input layer to the machine learning based classification model receives a three-dimensional (3D) matrix representation of the event window further comprising:

classifying the event window as actionable by applying the machine learning based classification model to the information pertaining to the event window, the information pertaining to the event window originating from a plurality of data sources:

determining whether the event window is actionable; and responsive to classifying the event window as actionable, wherein the event window is related to a security breach event or a non-compliant event, automatically creating, by the machine learning based classification model, an event ticket for the event window in the event monitoring system.

19. A computer system comprising:

one or more computer processors;

one or more computer readable storage media, wherein the one or more computer processors are structured, located, connected and/or programmed to execute program instructions collectively stored on the one or more computer readable storage media; and the program instructions, when executed by the one or more computer processors, cause the one or more computer processors to perform a method comprising:

identifying rules for relating events from one or more datasets in an event monitoring system, such as, an information technology service management (ITSM) system;

determining an event window having a set of related events within a particular time window, based, at least in part, on the rules, wherein determining the event window comprises:

determining a candidate event window having a set of related events within a candidate time window, based, at least in part, on the rules; and classifying the candidate event window as non-actionable by applying a machine learning based classification model to information pertaining to the candidate event window; and modifying the candidate event window to form the event window, wherein modifying the candidate event window to form the event window comprises expanding the candidate time window to include one or more additional related events;

training the machine learning based classification model, wherein an input layer to the machine learning based classification model receives a three-dimensional (3D) matrix representation of the event window further comprising:

classifying the event window as actionable by applying the machine learning based classification model to the information pertaining to the event window, the information pertaining to the event window originating from a plurality of data sources;

determining whether the event window is actionable; and responsive to classifying the event window as actionable, wherein the event window is related to a security breach event or a non-compliant event, automatically creating, by the machine learning based classification model, an event ticket for the event window in the event monitoring system.

\* \* \* \* \*